(12) United States Patent
Kanda

(10) Patent No.: US 6,892,120 B2
(45) Date of Patent: May 10, 2005

(54) ELECTRIC POWER STEERING APPARATUS

(75) Inventor: Koji Kanda, Kyoto (JP)

(73) Assignee: Koyo Seiko, Co., Ltd., Osaka (JP)

( * ) Notice: Subject to any disclaimer, the term of this patent is extended or adjusted under 35 U.S.C. 154(b) by 0 days.

(21) Appl. No.: 10/264,079

(22) Filed: Oct. 3, 2002

(65) Prior Publication Data

US 2003/0069676 A1 Apr. 10, 2003

(30) Foreign Application Priority Data

Oct. 5, 2001 (JP) ........................................ 2001-310526

(51) Int. Cl.[7] .............................................. B62D 5/04
(52) U.S. Cl. ........................... 701/41; 701/42; 180/443; 180/446
(58) Field of Search ..................... 701/41, 42; 180/443, 180/446

(56) References Cited

U.S. PATENT DOCUMENTS

| | | | | |
|---|---|---|---|---|
| 4,840,389 A | * | 6/1989 | Kawabe et al. | 180/415 |
| 5,189,613 A | * | 2/1993 | Karnopp | 701/41 |
| 5,198,981 A | * | 3/1993 | Collier-Hallman et al. | 701/42 |
| 5,343,393 A | * | 8/1994 | Hirano et al. | 701/41 |
| 5,504,403 A | | 4/1996 | McLaughlin | |
| 5,907,277 A | | 5/1999 | Tokunaga | |
| 6,152,255 A | * | 11/2000 | Noro et al. | 180/446 |
| 6,170,600 B1 | * | 1/2001 | Shimizu | 180/446 |

FOREIGN PATENT DOCUMENTS

| | | | |
|---|---|---|---|
| EP | 1 097 855 A2 | 5/2001 | |
| JP | 02011474 A | * 1/1990 | ............ B62D/7/14 |
| WO | WO 01/47762 A1 | 7/2001 | |

* cited by examiner

*Primary Examiner*—Michael J. Zanelli
*Assistant Examiner*—Eric M. Gibson
(74) *Attorney, Agent, or Firm*—Darby & Darby

(57) ABSTRACT

An electric power steering apparatus comprising a torque sensor for detecting the steering torque applied on the steering member of a vehicle; the first control unit for outputting the first control signal to drive a motor for steering assist, based on the steering torque detected by the torque sensor; the steering angle sensor for detecting the steering angle of the steering member; the norm steering unit for outputting a norm steering angle, based on a norm steering model which defines the relation between the steering torque and the norm steering angle; the second control unit for outputting the second control signal to drive the motor in order to reduce the difference between the norm steering angle outputted from the norm steering unit based on the steering torque and the detected steering angle; and the changing unit for switching between the first control signal and the second control signal, thereby being capable of switching between the driving at the steering torque determined regardless of the conditions of the road surface and the driving at the steering torque of the conventional steering assist.

16 Claims, 5 Drawing Sheets

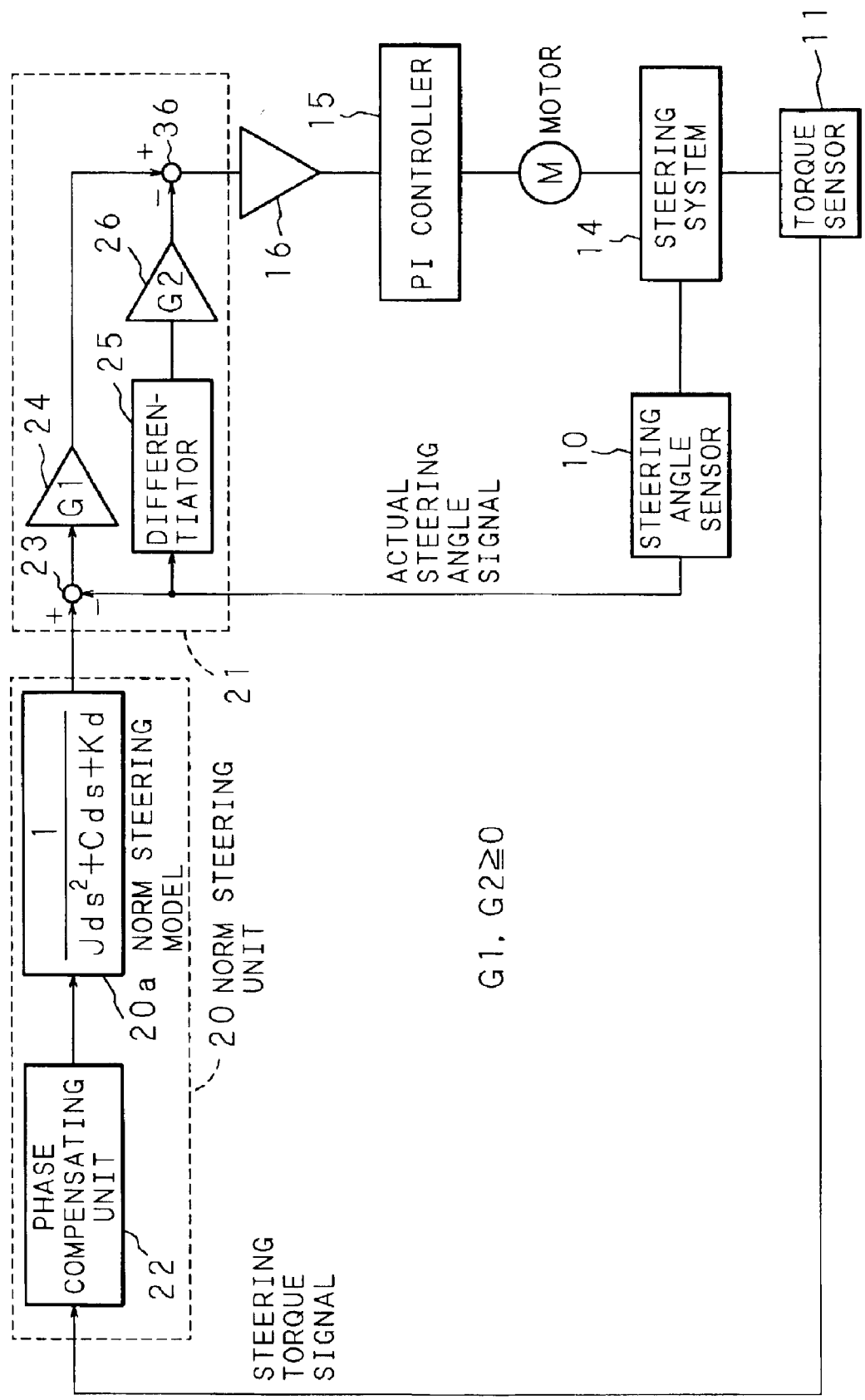

ELECTRIC POWER STEERING APPARATUS

BACKGROUND OF THE INVENTION

The present invention relates to an electric power steering apparatus provided with a torque sensor for detecting steering torque applied on a steering member of a vehicle and a control unit for outputting control signals to drive a motor for steering assist, based on the steering torque detected by the torque sensor.

The electric power steering apparatus equipped on a vehicle supports the steering of the vehicle with a motor, and is composed of a torque sensor for detecting steering torque applied on the steering member and a motor for steering assist that assists the operation of a steering mechanism where the steering member is linked by way of a steering axis. The motor for steering assist is so driven as to obtain power assistance in accordance with the steering torque detected by the torque sensor, thereby reducing the power to operate the steering member. In addition, the power assistance can be changed according to the speed of the vehicle so as not to make the power to operate the steering member too small while the vehicle is being driven at high speed.

In such an electric power steering apparatus, the power assistance is predetermined according to the steering torque and the speed of the vehicle. Therefore, the steering torque necessary for steering differs depending on the reaction forces from the road surface and the vehicle side, which lets a driver know the conditions of the road surface. However, in the case of physically disabled or senior drivers, the wheel might slip through their hands, and there are cases where it is desired to drive at the steering torque determined regardless of the conditions of the road surface.

BRIEF SUMMARY OF THE INVENTION

The main object of the present invention is to provide an electric power steering apparatus capable of switching between the driving at the steering torque determined regardless of the conditions of the road surface and the driving at the steering torque of the conventional steering assist.

The electric power steering apparatus of the first aspect of the present invention is an electric power steering apparatus comprising a torque sensor for detecting steering torque applied on a steering member of a vehicle, and first control means for outputting a first control signal to drive a motor for steering assist based on the steering torque detected by the torque sensor; the electric power steering apparatus being characterized by comprising a steering angle sensor for detecting a steering angle of the steering member; norm steering means for outputting a norm steering angle, based on a norm steering model which defines the relation between the steering torque and the norm steering angle; second control means for outputting a second control signal to drive the motor in order to reduce the difference between the norm steering angle outputted from the norm steering means based on the steering torque and the detected steering angle; and first changing means for switching between the first control signal and the second control signal.

In the electric power steering apparatus of the first aspect, the torque sensor detects the steering torque applied on the steering member of the vehicle, and the first control means outputs the first control signal to drive the motor for steering assist, based on the steering torque detected by the torque sensor. The steering angle sensor detects the steering angle of the steering member, and the norm steering means outputs the norm steering angle, based on the norm steering model which defines the relation between the steering torque and the norm steering angle. In order to reduce the difference between the norm steering angle outputted from the norm steering means based on the steering torque and the detected steering angle, the second control means outputs the second control signal to drive the motor for steering assist, and the first changing means switches between the first control signal and the second control signal. This allows switching between the driving at the steering torque determined regardless of the conditions of the road surface and the driving at the steering torque of the conventional steering assist.

The electric power steering apparatus of the second aspect of the present invention is characterized in that the electric power steering device of the first aspect further comprises judging means for judging whether behavior of the vehicle is abnormal or not; and the first changing means switches to the second control signal when the judging means judges that the behavior of the vehicle is abnormal.

In the electric power steering apparatus of the second aspect, the judging means judges whether the behavior of the vehicle is abnormal or not, and the first changing means switches to the second control signal when the judging means judges that the behavior of the vehicle is abnormal, thereby allowing an automatic changeover to the driving at the steering torque determined regardless of the conditions of the road surface as needed.

The electric power steering apparatus of the third aspect of the present invention is characterized in that in the first or second aspect the norm steering means has plural kinds of norm steering model, and that the electric power steering apparatus further comprises second changing means for switching the plural kinds of norm steering model.

In the electric power steering apparatus of the third aspect, the norm steering means has plural kinds of normal steering model, and the second changing means switches the plural kinds of normal steering model. This allows switching between the driving at the steering torque determined regardless of the conditions of the road surface and the driving at the steering torque of the conventional steering assist, and hence the driver can enjoy driving with the plural kinds of steering torque model determined regardless of the conditions of the road surface.

The electric power steering apparatus of the fourth aspect of the present invention is characterized in that the electric power steering apparatus in the third aspect further comprises driving condition detecting means for detecting the driving conditions of the vehicle, and the second changing means switches the plural kinds of norm steering model in accordance with the driving conditions detected by the driving condition detecting means.

In the electric power steering apparatus of the fourth aspect, the driving condition detecting means detects the driving conditions of the vehicle, and the second changing means switches the plural kinds of norm steering model, depending on the driving conditions detected by the driving condition detecting means. This allows switching between the driving at the steering torque determined regardless of the conditions of the road surface and the driving at the steering torque of the conventional steering assist, and hence the driver can drive at the steering torque model which is determined regardless of the conditions of the road surface and is suitable for the driving conditions of the vehicle.

The electric power steering apparatus of the fifth aspect of the present invention is characterized in that, in any of the first to fourth aspects, the second control means comprises deviation calculating means for calculating a deviation of the detected steering angle from the norm steering angle; first amplifying means for amplifying by a first gain the deviation calculated by the deviation calculating means; steering angular speed calculating means for calculating a steering angular speed from the detected steering angle; second amplifying means for amplifying by a second gain the steering angular speed calculated by the steering angular speed calculating means; and first subtracting means for subtracting the steering angular speed amplified by the second amplifying means from the deviation amplified by the first amplifying means, subtraction results of the first subtracting means being made the second control signal.

In the electric power steering apparatus of the fifth aspect, the deviation calculating means calculates the deviation of the detected steering angle from the norm steering angle, and the first amplifying means amplifies by the first gain the deviation calculated by the deviation calculating means. The steering angular speed calculating means calculates the steering angular speed from the detected steering angle, and the second amplifying means amplifies by the second gain the steering angular speed calculated by the steering angular speed calculating means. The first subtracting means subtracts the steering angular speed the second amplifying means has amplified from the deviation the first amplifying means has amplified, and makes the subtraction results the second control signal. This allows switching between the driving at the steering torque determined regardless of the conditions of the road surface and the driving at the steering torque of the conventional steering assist, thereby realizing an electric power steering device with few vibrations.

The electric power steering apparatus of the sixth aspect of the present invention is characterized by comprising, in the fifth aspect, third amplifying means for amplifying by a third gain the deviation calculated by the deviation calculating means; second subtracting means for subtracting the deviation amplified by the third amplifying means from the steering torque and providing the norm steering means with subtraction results as the steering torque; adding means for adding the first control signal and the second control signal; and gain variable means for changing each of the first gain and the third gain continuously; the first changing means continuously switching one from another among the first control signal, the second control signal and an intermediate control signal between the first control signal and the second control signal.

In the electric power steering apparatus of the sixth aspect, the third amplifying means amplifies by the third gain the deviation calculated by the deviation calculating means, and the second subtracting means subtracts the deviation amplified by the third amplifying means from the steering torque and provides the norm steering means with the subtraction results as the steering torque. The adding means adds the first control signal and the second control signal, and the gain variable means changes each of the first gain and the third gain continuously. The first changing means continuously switches one from another among the first control signal, the second control signal and the intermediate control signal between these control signals. This allows smooth and continuous switching between the driving at the steering torque determined regardless of the conditions of the road surface and the driving at the steering torque of the conventional steering assist.

The above and further objects and features of the invention will more fully be apparent from the following detailed description with accompanying drawings.

BRIEF DESCRIPTION OF THE SEVERAL VIEWS OF THE DRAWINGS

FIG. 2 is a block diagram showing the internal configuration of the second control unit and its related portions;

DETAILED DESCRIPTION OF THE INVENTION

The present invention will be described in detail as follows, based on the drawings showing its embodiments.

First Embodiment

Figure 1:
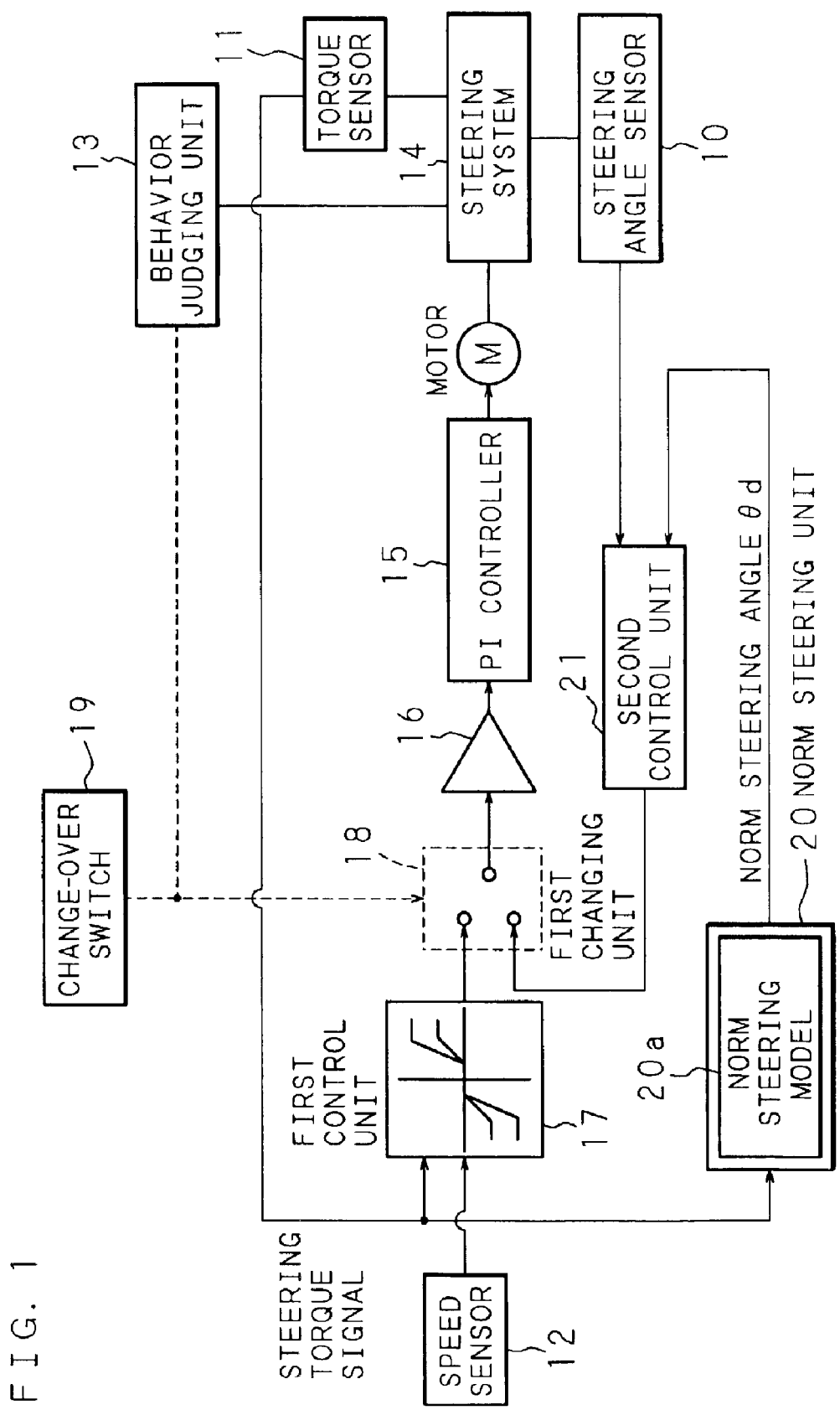
FIG. 1 is a block diagram showing the configuration of the main part of the first embodiment of the electric power steering apparatus of the present invention.

FIG. 1 is a block diagram showing the configuration of the main part of the first embodiment of the electric power steering apparatus of the present invention. The electric power steering apparatus comprises a torque sensor 11 which detects the steering torque applied on a steering member and a steering axis of a steering system 14, a motor M for steering assist which is linked to the steering system 14, a first control unit 17 which outputs the first control signal to drive the motor M for steering assist, based on the steering torque detected by the torque sensor 11 and the speed detected by a speed sensor 12, and a steering angle sensor 10 which detects the steering angle of a steering wheel of the steering system 14.

The electric power steering apparatus further comprises a norm steering unit 20 which outputs a norm steering angle θd, based on a norm steering model 20a which defines the relation between the steering torque detected by the torque sensor 11 and the norm steering angle, a second control unit 21 which outputs the second control signal to drive the motor M for steering assist in order to reduce the deviation of the steering angle detected by the steering angle sensor 10 from the norm steering angle θd outputted from the norm steering unit 20 based on the steering torque detected by the torque sensor 11, and a first changing unit 18 which switches between the first control signal and the second control signal and outputs the selected signal.

The electric power steering apparatus further comprises a hand-operated change-over switch 19 which operates in conjunction with the first changing unit 18, a behavior judging unit 13 which judges whether the behavior of the vehicle is abnormal or not using a yaw rate sensor or the like, and makes the first changing unit 18 select the second control signal when the behavior judging unit 13 judges that the behavior is abnormal, an amplifier 16 which amplifies the control signal selected and outputted by the first changing unit 18 inversely with the moderation ratio of the motor M and the torque constant, and a PI controller 15 which provides the motor M with a PI control signal, based on the control signal amplified by the amplifier 16.

FIG. 2 is a block diagram showing the internal configuration of the second control unit 21 and its related portions. The norm steering unit 20 includes a phase compensating unit 22 which compensates the phase delay of the steering torque. The norm steering model 20a is a second-order lag element $1/(Jds^2+Cds+Kd)$ consisting of the inertial moment Jd, the friction coefficient Cd and the spring constant Kd of the steering system 14, and is achieved by software.

The second control unit 21 is composed of a deviation calculator 23 which calculates and outputs the deviation of the steering angle (actual steering angle signal) detected by the steering angle sensor 10 from the norm steering angle θd outputted from the norm steering unit 20, an amplifier 24 (first amplifier) which amplifies by the gain G1 (first gain) the deviation outputted from the deviation calculator 23, a differentiator 25 which differentiates the steering angle detected by the steering angle sensor 10, an amplifier 26 (second amplifier) which amplifies by the gain G2 (second gain) the steering angle (steering angular speed) differentiated by the differentiator 25, and a subtracter 36 (first subtracter) which subtracts the output of the amplifier 26 from the output of the amplifier 24 and outputs the second control signal. The description of the other parts of the configuration will be omitted because it is done with FIG. 1. The first changing unit 18 is omitted.

The norm steering unit 20 computes the second-order lag element $1/(Jds^2+Cds+Kd)$ from the steering torque whose phase delay has been compensated by the phase compensating unit 22 so as to determine the norm steering angle θd. The deviation calculator 23 calculates the deviation of the steering angle detected by the steering angle sensor 10 from the norm steering angle θd computed by the norm steering unit 20, and the amplifier 24 amplifies this deviation by the gain G1. On the other hand, the steering angle detected by the steering angle sensor 10 is differentiated by the differentiator 25, and the differentiated steering angle (steering angular speed) is amplified by the amplifier 26 by the gain G2. The subtracter 36 subtracts the output of the amplifier 26 from the output of the amplifier 24, and outputs the second control signal.

The following is a description of the operation of the electric power steering apparatus with the above-described structure of the first embodiment.

The first control unit 17 outputs the first control signal, based on the steering torque detected by the torque sensor 11 and the speed detected by the speed sensor 12. The norm steering unit 20 computes and outputs the norm steering angle θd based on the steering torque, and the second control unit 21 outputs the second control signal through the above-described operation.

In conjunction with the operation of the change-over switch 19, the first changing unit 18 is switched over to either the first control unit 17 side or the second control unit 21 side, and outputs the first control signal or the second control signal. If an instruction signal is transmitted from the behavior judging unit 13 when the first changing unit 18 is on the first control unit 17 side, the first changing unit 18 is switched over to the second control unit 21 side and outputs the second control signal.

The first control signal or the second control signal is amplified by the amplifier 16, converted to the PI control signal by the PI controller 15, and given to the motor M for steering assist. When the first changing unit 18 is switched over to the second control unit 21 side and is outputting the second control signal, the driver can steer with the steering torque and the reaction force determined according to the steering angle, which prevents the steering wheel from being affected by the roughness of the road surface, friction, and the like.

Figure 3A:
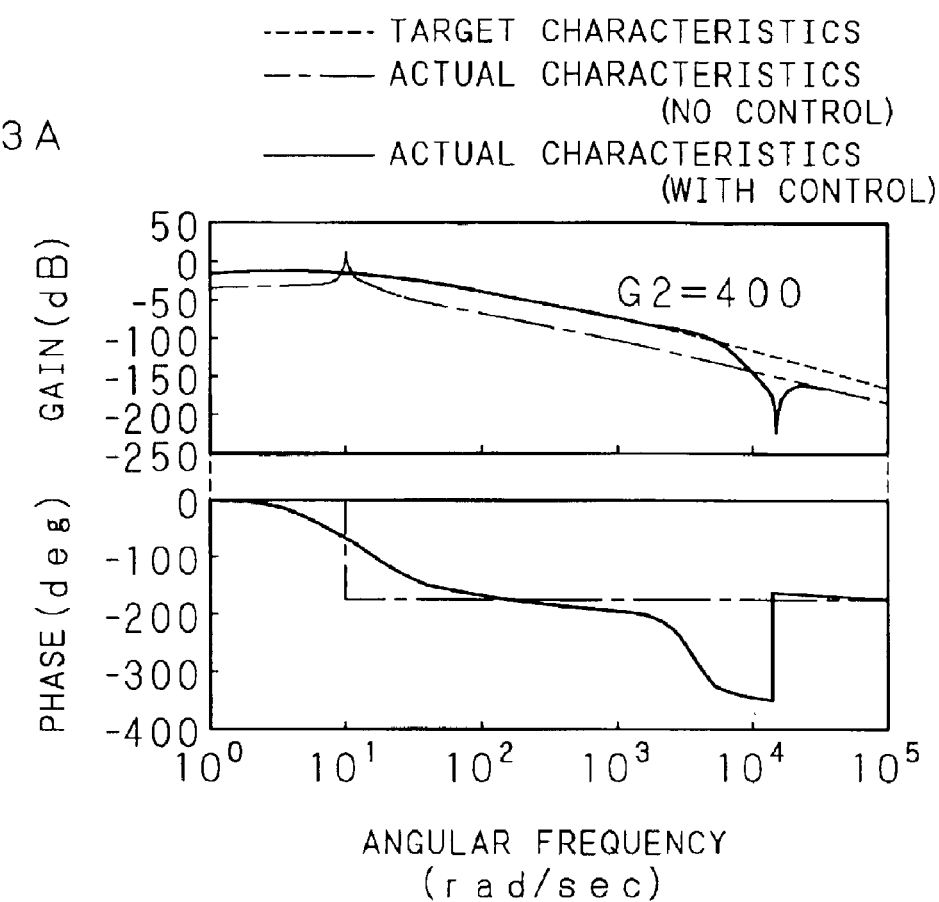
FIG. 3A is a view showing the frequency characteristics of the phase and the gain of the steering system when the steering angular speed is subtracted from the second control signal.
Figure 3B:
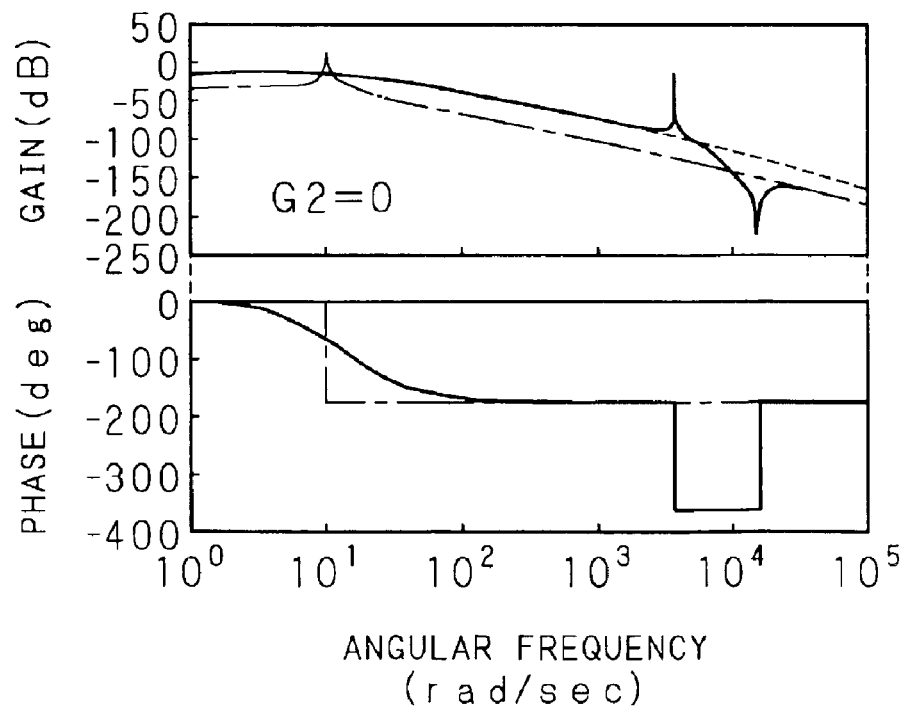
FIG. 3B is a view showing the frequency characteristics of the phase and the gain of the steering system when the steering angular speed is not subtracted from the second control signal.

FIGS. 3A, 3B are views showing the frequency characteristics of the phase and the gain of the steering system 14 in the case where the steering angular speed obtained by differentiating the steering angle detected by the steering angle sensor 10 is subtracted from the second control signal (FIG. 3A: the gain G2 of the amplifier 26 equals 400) and in the case where the obtained steering angular speed is not subtracted (FIG. 3B: the gain G2 of the amplifier 26 equals 0), respectively, inside the second control unit 21. In the case where the obtained steering angular speed is substracted (FIG. 3A), it is shown that vibrations are restrained.

Second Embodiment

Figure 4:
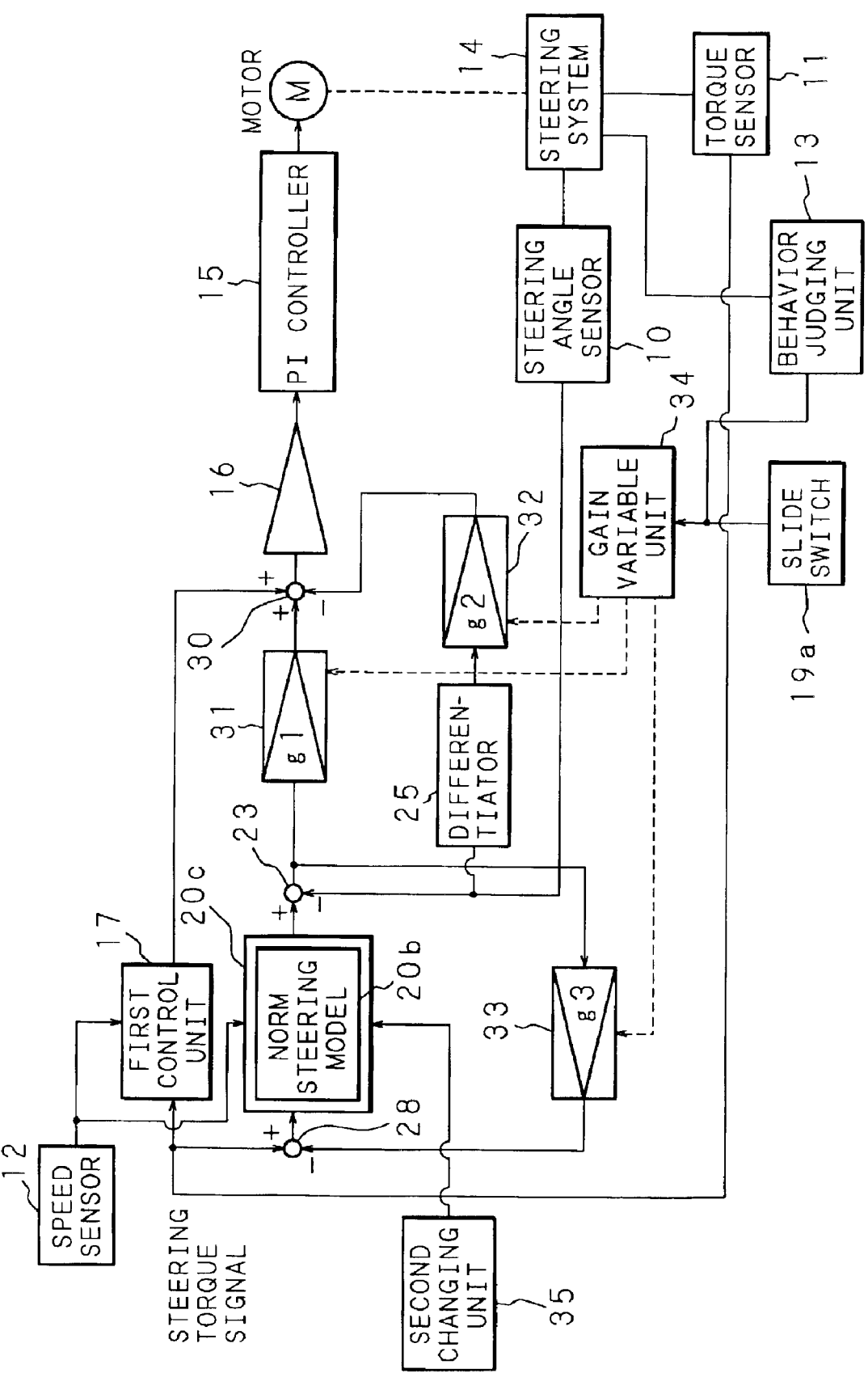
FIG. 4 is a block diagram showing the configuration of the main part of the second embodiment of the electric power steering apparatus of the present invention.

FIG. 4 is a block diagram showing the configuration of the main part of the second embodiment of the electric power steering apparatus of the present invention. The electric power steering apparatus comprises the torque sensor 11 which detects the steering torque applied on the steering member and the steering axis of the steering system 14, the motor M for steering assist which is linked to the steering system 14, the first control unit 17 which outputs the first control signal to drive the motor M for steering assist, based on the steering torque detected by the torque sensor 11 and the speed detected by the speed sensor 12, and the steering angle sensor 10 which detects the steering angle of the steering wheel of the steering system 14.

The electric power steering apparatus further comprises a norm steering unit 20c which outputs the norm steering angle, based on a norm steering model 20b which defines the relation between the steering torque detected by the torque sensor 11 and the norm steering angle, the deviation calculator 23 which calculates the deviation of the steering angle detected by the steering sensor 10 from the norm steering angle outputted from the norm steering unit 20c, an amplifier 31 (first amplifier) which amplifies by the gain g1 (first gain) the deviation outputted from the deviation calculator 23, the differentiator 25 which differentiates the steering angle detected by the steering angle sensor 10, an amplifier 32 (second amplifier) which amplifies by the gain g2 (second gain) the steering angle (steering angular speed) differentiated by the differentiator 25, and an adder 30 which subtracts the output of the amplifier 32 from the output of the amplifier 31 to produce the second control signal, and adds the first control signal from the first control unit 17 to the second control signal.

The norm steering model 20b has plural kinds of norm steering model 20a as described in the first embodiment, and the norm steering unit 20c makes a choice among the plural kinds of norm steering model in accordance with the speed detected by the speed sensor 12, in such a manner that the steering torque is made comparatively heavy when the speed is high. The norm steering unit 20c switches among the plural kinds of norm steering model through the manual operation of the second changing unit 35.

The electric power steering apparatus further comprises an amplifier 33 (third amplifier) which amplifies by the gain g3 (third gain) the deviation outputted from the deviation calculator 23, a subtracter 28 (second subtracter) which subtracts the deviation amplified by the amplifier 33 from the steering torque detected by the torque sensor 11, and provides the subtracted steering torque to the norm steering model 20b, a gain variable unit 34 which changes each of the gains g1, g2, and g3 continuously, and a slide switch 19a which operates in conjunction with the gain variable unit 34 and makes the gain variable unit 34 change the gains g1, g2, and g3 continuously and smoothly according to the sliding position.

The gain variable unit 34 can set the mixture ratio between the first control signal and the second control signal in the control signal outputted from the adder 30 by changing the gains g1, g2, and g3. For example, when the control signal is exclusively composed of the first control signal, the gain g1=0 and the gain g3=500, whereas the control signal is exclusively composed of the second control signal, the gain g1=125000 and the gain g3=0. When the mixture ratio is between these cases, the gains g1 and g3 are set by being changed continuously in reverse proportion. The gain g2 is properly set according to the gains g1 and g3 so as not to cause vibrations.

The electric power steering apparatus further comprises the behavior judging unit 13 which judges whether the behavior of the vehicle is abnormal or not using a yaw rate sensor or the like, and makes the gain variable unit 34 switch the output from the adder 30 over to the second control signal when the behavior judging unit 13 judges that the behavior is abnormal, the amplifier 16 which amplifies the control signal outputted from the adder 30 inversely with the moderation ratio of the motor M and the torque constant, and the PI controller 15 which provides the motor M with the PI control signal, based on the control signal amplified by the amplifier 16.

The following is a description of the operation of the electric power steering apparatus with the above-described structure of the second embodiment.

The first control unit 17 outputs the first control signal, based on the steering torque detected by the torque sensor 11 and the speed detected by the speed sensor 12, and provides it to the adder 30. The norm steering unit 20c computes and outputs the norm steering angle based on the steering torque from which the deviation amplified by the amplifier 33 is subtracted. The deviation of the steering angle detected by the steering angle sensor 10 from the norm steering angle is amplified by the amplifier 31 by the gain g1 and given to the adder 30.

On the other hand, the steering angle detected by the steering angle sensor 10 is differentiated by the differentiator 25, and the differentiated steering angle (steering angular speed) is amplified by the amplifier 32 by the gain g2. The adder 30 produces the second control signal by subtracting the output of the amplifier 32 from the output of the amplifier 31.

The gain variable unit 34 sets the gains g1, g2, and g3 by changing them smoothly and continuously according to the sliding position of the slide switch 19a. As a result, the mixture ratio between the first control signal and the second control signal in the control signal outputted from the adder 30 is set and hence the driver can enjoy driving at the steering torque of various steering assist between the first control unit 17 and the second control unit 21. When an instruction signal is transmitted from the behavior judging unit 13, the gain variable unit 34 changes the mixture ratio between the first control signal and the second control signal gradually to the whole second control signal.

The control signal outputted from the adder 30 is amplified by the amplifier 16, thereafter, it is converted to the PI control signal by the PI controller 15, and given to the motor M for steering assist. When the control signal outputted from the adder 30 is the whole second control signal, the driver can steer with the steering torque and the reaction force determined according to the steering angle, which prevents the steering wheel from being affected by the roughness of the road surface, friction, and the like.

Figure 5:
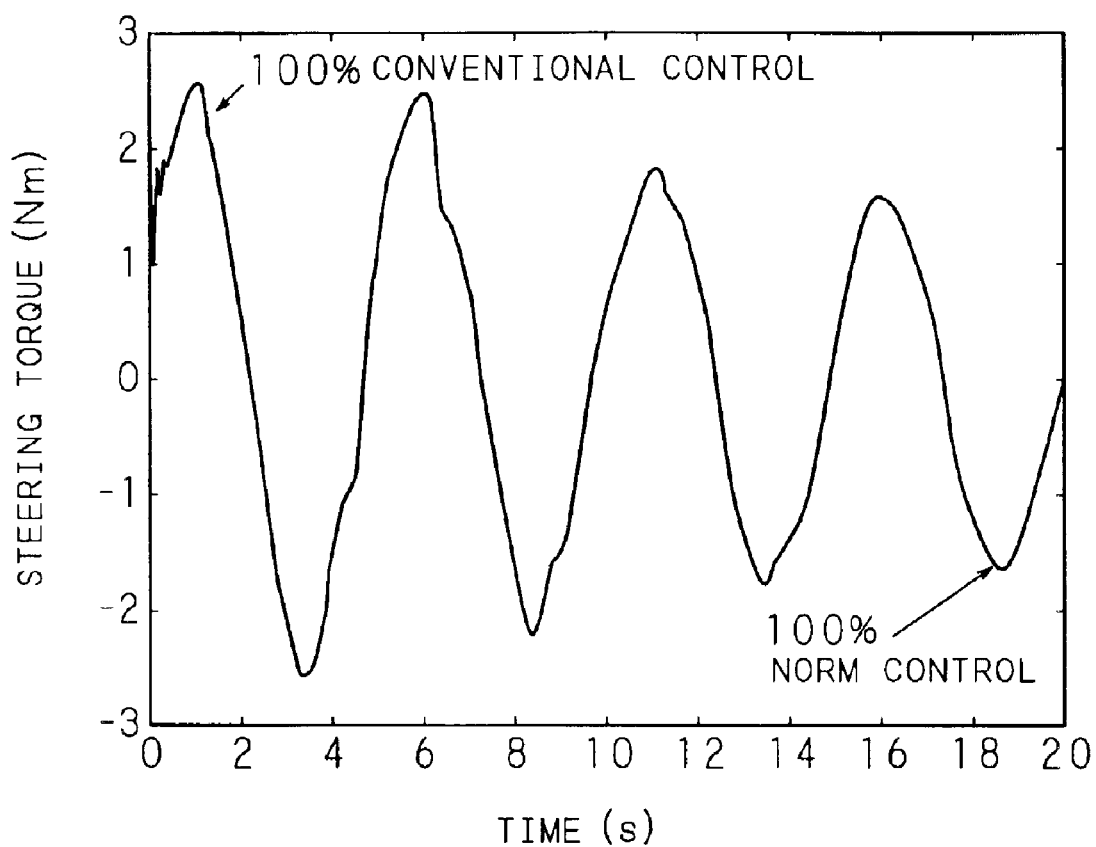
FIG. 5 is a waveform chart showing the transition of the steering torque when the mixture ratio between the first control signal and the second control signal is changed.

FIG. 5 is a waveform chart showing the transition of the steering torque (the steering wheel is operated periodically) when the mixture ratio between the first control signal and the second control signal in the control signal outputted from the adder 30 is changed from the whole first control signal (conventional control) to the whole second control signal (norm control) in 20 seconds. It shows a continuous and smooth transition from the conventional control to the norm control.

As detailed hereinbefore, the electric power steering apparatus of the present invention can switch between the driving at the steering torque determined regardless of the conditions of the road surface and the driving at the steering torque of the conventional steering assist.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus comprising:
    a torque sensor for detecting steering torque applied on a steering member of a vehicle;
    a first control unit for outputting a first control signal to drive a motor for steering assist, based on the steering torque detected by said torque sensor;
    a steering angle sensor for detecting a steering angle of said steering member;
    a norm steering unit for outputting a norm steering angle, based on a norm steering model which defines the relation between the steering torque and the norm steering angle;
    a second control unit for outputting a second control signal to drive said motor in order to reduce the difference between the norm steering angle outputted from said norm steering unit based on the steering torque and the detected steering angle; and
    a first changing unit for switching between said first control signal and said second control signal;
    wherein said norm steering unit has plural kinds of norm steering model, and
    further comprising a second changing unit for switching said plural kinds of norm steering model.

2. The electric power steering apparatus of claim 1, further comprising a driving condition detecting unit for detecting driving conditions of said vehicle,
    wherein said second changing unit switches said plural kinds of norm steering model in accordance with the driving conditions detected by said driving condition detecting unit.

3. The electric power steering apparatus of claim 2, wherein said second control unit comprises a deviation calculator for calculating a deviation of the detected steering angle from the norm steering angle; a first amplifier for amplifying by a first gain the deviation calculated by said deviation calculator; a steering angular speed calculator for calculating a steering angular speed from the detected steering angle; a second amplifier for amplifying by a second gain the steering angular speed calculated by said steering angular speed calculator; and a first subtracter for subtracting the steering angular speed amplified by said second amplifier from the deviation amplified by said first amplifier, subtraction results of said first subtracter being made said second control signal.

4. The electric power steering apparatus of claim 3, further comprising:

a third amplifier for amplifying by a third gain the deviation calculated by said deviation calculator;

a second subtracter for subtracting the deviation amplified by said third amplifier from the steering torque and providing said norm steering unit with subtraction results as the steering torque;

an adder for adding said first control signal and said second control signal; and a gain variable unit for changing each of said first gain and said third gain continuously;

wherein said first changing unit continuously switches one from another among said first control signal, said second control signal, and an intermediate control signal between said first control signal and said second control signal.

5. The electric power steering apparatus of claim 1, wherein said second control unit comprises a deviation calculator for calculating a deviation of the detected steering angle from the norm steering angle; a first amplifier for amplifying by a first gain the deviation calculated by said deviation calculator; a steering angular speed calculator for calculating a steering angular speed from the detected steering angle; a second amplifier for amplifying by a second gain the steering angular speed calculated by said steering angular speed calculator; and a first subtracter for subtracting the steering angular speed amplified by said second amplifier from the deviation amplified by said first amplifier, subtraction results of said first subtracter being made said second control signal.

6. The electric power steering apparatus of claim 5, further comprising:

a third amplifier for amplifying by a third gain the deviation calculated by said deviation calculator;

a second subtracter for subtracting the deviation amplified by said third amplifier from the steering torque and providing said norm steering unit with subtraction results as the steering torque;

an adder for adding said first control signal and said second control signal; and a gain variable unit for changing each of said first gain and said third gain continuously;

wherein said first changing unit continuously switches one from another among said first control signal, said second control signal, and an intermediate control signal between said first control signal and said second control signal.

7. An electric power steering apparatus comprising:

a torque sensor for detecting steering torque applied on a steering member of a vehicle;

a first control unit for outputting a first control signal to drive a motor for steering assist, based on the steering torque detected by said torque sensor;

a steering angle sensor for detecting a steering angle of said steering member;

a norm steering unit for outputting a norm steering angle, based on a norm steering model which defines the relation between the steering torque and the norm steering angle;

a second control unit for outputting a second control signal to drive said motor in order to reduce the difference between the norm steering angle outputted from said norm steering unit based on the steering torque and the detected steering angle; and a first changing unit for switching between said first control signal and said second control signal;

further comprising a judging unit for judging whether behavior of said vehicle is abnormal or not;

wherein said first changing unit switches to said second control signal when said judging unit judges that the behavior of said vehicle is abnormal;

wherein said norm steering unit has plural kinds of norm steering model, and further comprising a second changing unit for switching said plural kinds of norm steering model.

8. The electric power steering apparatus of claim 7, further comprising a driving condition detecting unit for detecting driving conditions of said vehicle, wherein said second changing unit switches said plural kinds of norm steering model in accordance with the driving conditions detected by said driving condition detecting unit.

9. The electric power steering apparatus of claim 8, wherein said second control unit comprises a deviation calculator for calculating a deviation of the detected steering angle from the norm steering angle; a first amplifier for amplifying by a first gain the deviation calculated by said deviation calculator; a steering angular speed calculator for calculating a steering angular speed from the detected steering angle; a second amplifier for amplifying by a second gain the steering angular speed calculated by said steering angular speed calculator; and a first subtracter for subtracting the steering angular speed amplified by said second amplifier from the deviation amplified by said first amplifier, subtraction results of said first subtracter being made said second control signal.

10. The electric power steering apparatus of claim 9, further comprising:

a third amplifier for amplifying by a third gain the deviation calculated by said deviation calculator;

a second subtracter for subtracting the deviation amplified by said third amplifier from the steering torque and providing said norm steering unit with subtraction results as the steering torque;

an adder for adding said first control signal and said second control signal; and a gain variable unit for changing each of said first gain and said third gain continuously;

wherein said first changing unit continuously switches one from another among said first control signal, said second control signal, and an intermediate control signal between said first control signal and said second control signal.

11. The electric power steering apparatus of claim 7, wherein said second control unit comprises a deviation calculator for calculating a deviation of the detected steering angle from the norm steering angle; a first amplifier for amplifying by a first gain the deviation calculated by said deviation calculator; a steering angular speed calculator for calculating a steering angular speed from the detected steering angle; a second amplifier for amplifying by a second gain the steering angular speed calculated by said steering angular speed calculator; and a first subtracter for subtracting the steering angular speed amplified by said second amplifier from the deviation amplified by said first amplifier, subtraction results of said first subtracter being made said second control signal.

12. The electric power steering apparatus of claim 11, further comprising:
a third amplifier for amplifying by a third gain the deviation calculated by said deviation calculator;
a second subtracter for subtracting the deviation amplified by said third amplifier from the steering torque and providing said norm steering unit with subtraction results as the steering torque;
an adder for adding said first control signal and said second control signal; and
a gain variable unit for changing each of said first gain and said third gain continuously;
wherein said first changing unit continuously switches one from another among said first control signal, said second control signal, and an intermediate control signal between said first control signal and said second control signal.

13. An electric power steering apparatus comprising:
a torque sensor for detecting steering torque applied on a steering member of a vehicle;
a first control unit for outputting a first control signal to drive a motor for steering assist, based on the steering torque detected by said torque sensor;
a steering angle sensor for detecting a steering angle of said steering member;
a norm steering unit for outputting a norm steering angle, based on a norm steering model which defines the relation between the steering torque and the norm steering angle;
a second control unit for outputting a second control signal to drive said motor in order to reduce the difference between the norm steering angle outputted from said norm steering unit based on the steering torque and the detected steering angle; and
a first changing unit for switching between said first control signal and said second control signal;
wherein said second control unit comprises a deviation calculator for calculating a deviation of the detected steering angle from the norm steering angle; a first amplifier for amplifying by a first gain the deviation calculated by said deviation calculator; a steering angular speed calculator for calculating a steering angular speed from the detected steering angle; a second amplifier for amplifying by a second gain the steering angular speed calculated by said steering angular speed calculator; and a first subtracter for subtracting the steering angular speed amplified by said second amplifier from the deviation amplified by said first amplifier, subtraction results of said first subtracter being made said second control signal.

14. The electric power steering apparatus of claim 13, further comprising:
a third amplifier for amplifying by a third gain the deviation calculated by said deviation calculator;
a second subtracter for subtracting the deviation amplified by said third amplifier from the steering torque and providing said norm steering unit with subtraction results as the steering torque;
an adder for adding said first control signal and said second control signal; and
a gain variable unit for changing each of said first gain and said third gain continuously;
wherein said first changing unit continuously switches one from another among said first control signal, said second control signal, and an intermediate control signal between said first control signal and said second control signal.

15. An electric power steering apparatus comprising:
a torque sensor for detecting steering torque applied on a steering member of a vehicle;
a first control unit for outputting a first control signal to drive a motor for steering assist, based on the steering torque detected by said torque sensor;
a steering angle sensor for detecting a steering angle of said steering member;
a norm steering unit for outputting a norm steering angle, based on a norm steering model which defines the relation between the steering torque and the norm steering angle;
a second control unit for outputting a second control signal to drive said motor in order to reduce the difference between the norm steering angle outputted from said norm steering unit based on the steering torque and the detected steering angle; and
a first changing unit for switching between said first control signal and said second control signal;
further comprising a judging unit for judging whether behavior of said vehicle is abnormal or not;
wherein said first changing unit switches to said second control signal when said judging unit judges that the behavior of said vehicle is abnormal;
wherein said second control unit comprises
a deviation calculator for calculating a deviation of the detected steering angle from the norm steering angle;
a first amplifier for amplifying by a first gain the deviation calculated by said deviation calculator;
a steering angular speed calculator for calculating a steering angular speed from the detected steering angle;
a second amplifier for amplifying by a second gain the steering angular speed calculated by said steering angular speed calculator; and
a first subtracter for subtracting the steering angular speed amplified by said second amplifier from the deviation amplified by said first amplifier,
subtraction results of said first subtracter being made said second control signal.

16. The electric power steering apparatus of claim 15, further comprising:
a third amplifier for amplifying by a third gain the deviation calculated by said deviation calculator;
a second subtracter for subtracting the deviation amplified by said third amplifier from the steering torque and providing said norm steering unit with subtraction results as the steering torque;
an adder for adding said first control signal and said second control signal; and
a gain variable unit for changing each of said first gain and said third gain continuously;
wherein said first changing unit continuously switches one from another among said first control signal, said second control signal, and an intermediate control signal between said first control signal and said second control signal.

* * * * *